May 11, 1965  M. C. KUCZEWSKI DE PORAY  3,183,318

HIGH SPEED CYCLICAL ROTARY MERCURY SWITCH

Filed Dec. 7, 1962

INVENTOR:
MARCEL CYPRIEN KUCZEWSKI DE PORAY
BY
E. M. Squire
ATTY.

United States Patent Office 3,183,318
Patented May 11, 1965

3,183,318
HIGH SPEED CYCLICAL ROTARY
MERCURY SWITCH
Marcel Cyprien Kuczewski de Poray, Rue des
Quatre-Saisons, Rodez, France
Filed Dec. 7, 1962, Ser. No. 243,139
Claims priority, application France, Dec. 12, 1961,
881,759; Dec. 17, 1962, Patent 1,315,885
4 Claims. (Cl. 200—32)

The present invention relates to high speed cyclical rotary mercury switches whereby it is possible to close (and open) a number of circuits in accordance with a pre-determined sequence during a cycle which is repeated at an adjustable frequency.

The object of the invention is to provide a contactor of this type operative at high speed (100 to 1000 r.p.m.) in which the progression of a globule of mercury is caused by the action of centrifugal force combined with the effect of gravity.

The cyclical switch, according to the invention comprises an insulating annulus in the form of a hollow toroidal tube, a plurality of spaced electrodes extending into the annulus through the wall thereof, and a globule of mercury for performing the switching operation, the mercury being freely movably confined within the annulus so that it may successively engage the electrodes. The annulus is mounted on a shaft which is rigidly connected thereto, the shaft being in alignment with the principal axis of the toroidal annulus. A fixed support is provided for the lower end of the shaft. A power operated driving device, preferably of adjustable speed, freely movably engages the upper end portion of the shaft and drives the upper end portion around a horizontal circular path the center of which is located directly above the fixed support. The lower end of the shaft is connected to the fixed support by a yieldable connecting device which is capable of bending in any axial vertical plane passing through the center of the circular path. The connecting device may take the form of a rubber tube, a resilient rod, or a torsion resisting coil spring. In any event, the connecting device effectively prevents rotation of the supporting shaft with respect to the fixed support.

Further features and advantages of the invention will become apparent from the ensuing description, with reference to the accompanying drawings.

Figure 1:
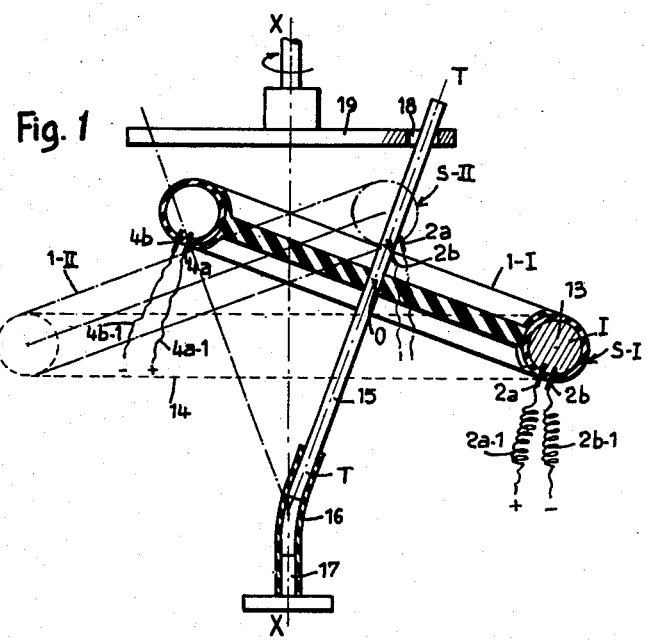
FIG. 1 is an elevational view of the switch.
Figure 2:
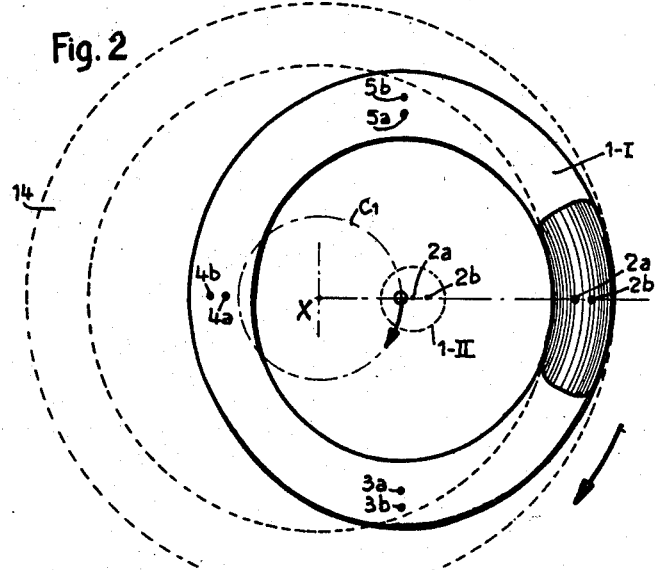
FIG. 2 is a diagrammatic plan view of the switch.

As shown in FIGS. 1 and 2, a hollow toroidal tube 1 is secured to the upper portion of rigid rod or shaft 15 whose axis is aligned with the principal axis of the toroidal tube 1 and which has a lower end which is a drive fit in a yieldable connecting member 16 so that the shaft 15 cannot rotate about its longitudinal axis. The connecting member 16 is capable of bending in all planes of azimuth but effectively resists torsion. A tube of rubber or the like having a rather thick wall and being a drive fit on the rod 15 can be used for this purpose. This connecting member is fitted on a fixed support formed by a vertical pin 17, coaxial with the vertical axis of rotation XX, in such manner that the connecting member 16 cannot rotate relative to the pin 17.

The upper end portion of the rod 15 is driven in rotation about a horizontal circular path the center of which lies on the vertical axis XX directly above the fixed support 17. For this purpose, this end portion freely movably extends into an aperture 18 formed in a rotary element, such as a motor operated disc 19 which is driven in rotation about the vertical axis XX.

The device is provided with pairs of electrodes, for example four pairs 2a–2b, 3a–3b, 4a–4b, 5a–5b, connected to flexible pigtail connections such as 2a–1, 2b–1, and 4a–1, 4b–1, which are connected to electrodes 2a–2b and 4a–4b (the other connections being not shown in the drawing), and a mass of mercury 13.

The centre O of the toroidal tube 1 is maintained at a substantial radial distance from the axis XX. The axis TT of the rod 15 therefore describes about the axis XX a circular conical surface. In the course of this movement, owing to the fact that the flexible tubular member 16 is subjected to a bending force but to practically no torsional force, or in any case to very small torsional forces capable of twisting the member 16, each elemental portion of the toroidal tube describes an arcuate path between a lower position and an upper position and eccentric relative to the vertical axis of rotation XX. For example, when the tube passes from the position 1–I (FIG. 1), shown in full line, to the position 1–II, shown in dot-dash line, the electrodes 2a, 2b pass from the position S–I to the position S–II. Each portion of the tube 1 passes successively through the lower level or position which is also the position of maximum distance from the axis XX.

Consequently, the mass of mercury 13 travels as a toroidal segment through the horizontal circular path 14 and successively short-circuits the various pairs of electrodes. The relative movement of the mercury in the toric envelope is brought about by the combined actions, in the same direction, of centrifugal force and the force of gravity.

It is preferable to give to the component parts such dimensions that the closed curve described by any portion of the tube 1 does not pass through the vertical axis of rotation XX of the device. In this way, the provision of flexible connections to the electrodes is simplified, and the connecting pigtail conductors, such as 2a–1 and 2b–1, can then be easily disposed so that the circular translation of the electrodes does not result in the winding of these conductors about the axis of rotation of the device.

This contactor is of great utility in many applications. It can be employed in particular for controlling the lighting of a device for observing pictures having networks which have different orientations described in U.S. Patent No. 2,560,392. This application has been indicated merely by way of example.

Although specific embodiments of the invention have been described, many modifications and changes may be made therein without departing from the scope of the invention as defined in the appended claims.

For example, depending on the switching effects it is desired to obtain, the electrodes can be disposed not only in the form of pairs but also in the form of separate electrodes and can comprise one or more common electrodes disposed on a relatively large length of arc.

Figure 3:
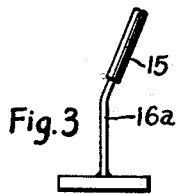
FIG. 3 is a fragmentary elevational view showing a modified form of switch wherein a resilient rod serves as the yieldable connecting device.
Figure 4:
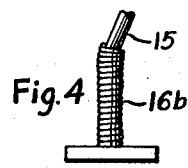
FIG. 4 is a fragmentary elevational view similar to FIG. 3 and showing a further modification wherein a torsion resisting coil spring is provided for operation as the yieldable connecting device.

FIG. 3 shows a modification wherein the resilient member supporting the rod 15 is constituted by a flexible spring which resists torsional stress, the spring being formed by a resilient rod 16a. FIG. 4, a helical torsion resisting coil spring 16b having contacting coils is used as the resilient connecting member.

Having now described my invention what I claim as new and desire to secure by Letters Patent is:

1. A cyclic rotary switch, comprising: an insulating annulus in the form of a hollow toroidal tube, a plurality of spaced electrodes extending into the annulus through the wall thereof, a globule of mercury confined within and freely movable around said annulus to successively engage said electrodes, a shaft solid with said annulus and in alignment with the central axis thereof, a fixed support for the lower end portion of said shaft, driving means freely movably engaging the upper end portion of said shaft and driving said upper end portion around a a horizontal circular path having its center directly above said fixed support, and yieldable connecting means connecting said lower end portion to said fixed support, said yieldable connecting means being capable of bending in any axial vertical plane passing through the center of said path, said connecting means effectively preventing any rotation of said shaft with respect to said fixed support.

2. Mercury rotary switch according to claim 1, wherein said yieldable connecting means is a rubber tube having a thick wall substantially resisting torsional stress.

3. Mercury rotary switch according to claim 1, wherein said yieldable connecting means is a resilient rod.

4. Mercury rotary switch according to claim 1, wherein said yieldable connecting means is a coil spring resisting torsional stress.

References Cited by the Examiner

UNITED STATES PATENTS

| | | | |
|---|---|---|---|
| 1,937,137 | 11/33 | Barclay | 200—32 |
| 2,848,570 | 8/58 | Cole | 200—32 |

BERNARD A. GILHEANY, *Primary Examiner.*

ROBERT K. SCHAEFER, *Examiner.*